United States Patent Office 3,268,521
Patented August 23, 1966

1

3,268,521
16α-HYDROXY-21-CARBOXYLIC ACID γ-LAC-
TONES OF THE PREGNANE SERIES AND
THE 16β-METHYL DERIVATIVES THEREOF
John E. Pike, Kalamazoo, Mich., assignor to The Upjohn
Company, Kalamazoo, Mich., a corporation of Delaware
No Drawing. Filed Oct. 29, 1964, Ser. No. 407,564
The portion of the term of the patent subsequent to
Dec. 22, 1981, has been disclaimed
18 Claims. (Cl. 260—239.57)

This application is a continuation-in-part of application Serial No. 195,339, filed May 16, 1962, now Pat. No. 3,162,631.

The present invention relates to a novel process and products, and is more particularly concerned with a process for the production of 16-hydroxy-21-carboxylic acid γ-lactones and the resulting products.

The novel process can be illustratively represented by the following formulae:

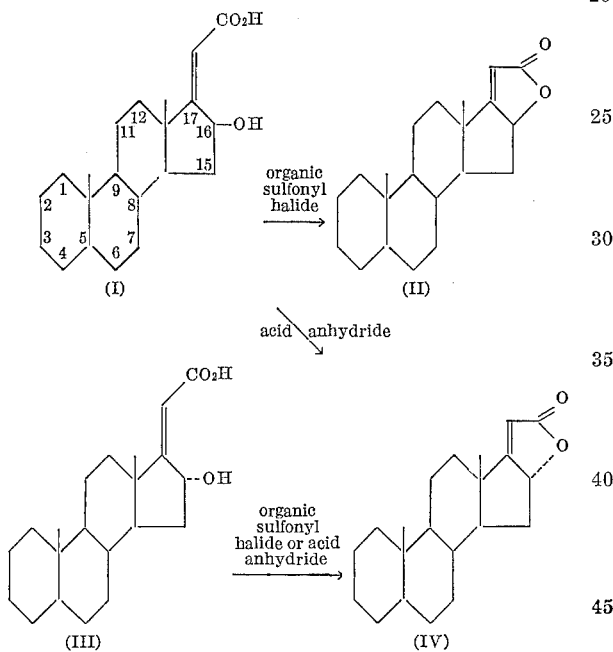

The process of the present invention comprises: treating a 16β-hydroxy- (I) or 16α-hydroxy-21-carboxy-trans-17(20)-pregnen (III) with a reagent selected from the group consisting of organic sulfonyl halides of the formula:

ROSO$_2$X wherein R is selected from the group consisting of alkyl, aryl and aralkyl, containing up to and including ten carbon atoms, and wherein X is a halogen selected from the group consisting of chlorine and bromine, and acid anhydrides of hydrocarbon carboxylic acids containing from two to twelve carbon atoms, inclusive, to obtain the corresponding lactones of Formulae II and IV. When an acid anhydride was used the starting material I gives a mixture containing products II and IV.

The 16-hydroxy (α and β)-17(20)-pregnen-21-oic acids (I and III) herein used as starting material may have various substituents such as: In positions 3 and 11, a substituent selected from the group consisting of keto,

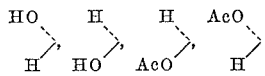

in which Ac, in the 3-position, is selected from the group consisting of acyl radicals of hydrocarbon carboxylic

2 acids containing from two to twelve carbon atoms, inclusive,

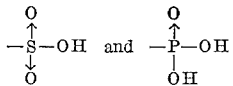

and in the 11-position Ac is the acyl radical of a hydrocarbon carboxylic acid defined as above; in the 3-position a 1,2 or 1,3-dioxoalkylene group, wherein the alkylene has from one to eight carbon atoms, inclusive; in position 5α a hydroxy group; in position 6 a substituent selected from the group consisting of chlorine, bromine, fluorine and methyl; and a substituent selected from the group consisting of fluorine, chlorine, bromine, iodine and methyl in positions 7, 9, 12 and/or 16. The starting material moreover can have additional double bonds, particularly in position 1(2), 4(5), 5(6), 6(7) and the like.

The final product obtained corresponds in regard to the substituents with the starting material except that sometimes a free hydroxyl group may esterify with the lactone condensation agent. Thus, a 3,16-dihydroxy-trans-17(20)-pregnen-21-oic acid may give with acetic anhydride the corresponding 3-acetoxy-17(20)-pregnen-21-oic acid γ-lactone.

One of the principal objects of this invention is to provide not only new methods to make the above-described γ-lactones, but also to provide novel γ-lactones of the following formulae:

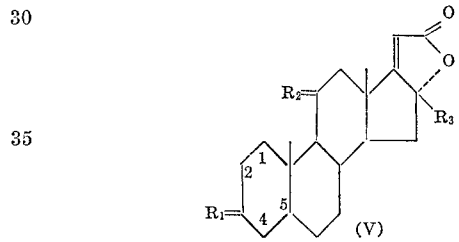

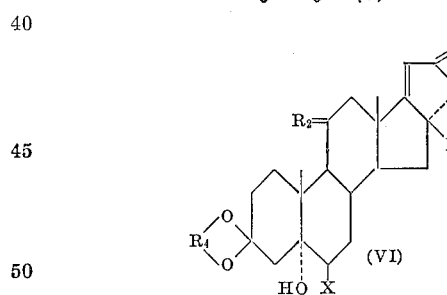

wherein R$_1$ is selected from the group consisting of

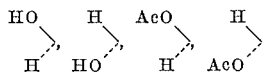

and keto oxygen, in which Ac is the acyl group of a hydrocarbon carboxylic acid containing from two to twelve carbon atoms, inclusive; wherein R$_2$ is selected from the group consisting of

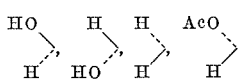

and keto oxygen, in which Ac is defined as hereinabove; wherein R$_3$ is selected from hydrogen and methyl; wherein R$_4$ is an alkylene radical containing not more than eight carbon atoms, inclusive, and the attaching oxygen to carbon bonds are separated by a chain of at least two and not more than three carbon atoms; wherein X is selected from the group consisting of chlorine, fluorine and methyl; wherein the linkage of the carbon atoms in positions 1,2 and 4,5 of the compound of Formula V are selected from the group consisting of single bonds, the combination of one double bond in positions 4, 5 and a single bond, and the combination of two double bonds, with the proviso that if the compound of Formula V has no 4,5 double bond, the 5-carbon atom has a substituent selected from the group consisting of α-hydrogen and β-hydrogen.

Another important object of the present invention is to provide products of the formula:

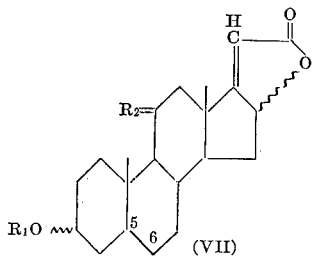

wherein $R_1$ is selected from the group consisting of

and

wherein $R_2$ is selected from the group consisting of

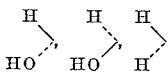

and keto oxygen; and wherein the linkage between carbon atoms 5 and 6 is selected from the group consisting of single and double bonds.

The wavy linkage "∼" signifies that the substituent is connected to the steroid nucleus by a bond selected from the group consisting of α- and β-bonds.

The novel compounds of structural Formulae V, VI and VII exhibit a considerable amount of cytotoxicity against KB cells as measured in tissue cultures. The 16α-hydroxy - 3,11 - diketo-1,4,17(20)-pregnatrien-21-oic acid γ-lactone in a concentration of 0.08 γ/ml. inhibits 50% of KB cell activity. Solutions containing from 1 to 10 parts per million of the above compounds of Formulae V, VI and VII can therefore be used in laboratory cancer work for washing instruments, laboratory vessels and gloves used in cancer tissue work to destroy viable KB cells. The compounds furthermore have antibacterial action against *S. aureus, B. subtilis, S. Albus* and others when used in concentrations of 100 to 1000 parts per million. The compounds of the above Formulae V, VI and VII can therefore also be used for cleaning and disinfecting equipment used in contact with such microorganisms.

The compounds are also used successfully against aggressive behavior in male mice which make it necessary to cage these animals individually rather than in groups of 5 to 10 mice. Quantities of 5 to 25 mg./kg. per mouse body weight eliminated the fighting of caged groups of male mice. The tranquillization effect of these compounds can also be used in other animals for calming these animals, for example, during transport in trains. Dogs and cattle can thus be tranquilized and arrive at the point of destination in healthier and more attractive conditions.

The starting material of this invention trans-17(20)-pregnen-21-oic acids are obtained from the alkyl esters by hydrolysis as further shown in the examples.

In carrying out the process of the present invention, the starting material, a 16α-hydroxy-17(20)-pregnen-21-oic acid (III), or a 16β-hydroxy-17(20)-pregnen-21-oic acid (I), is treated with a compound selected from the group consisting of organic sulfonyl halides and hydrocarbon carboxylic anhydrides. Organic sulfonyl halides which are useful in this reaction are arylsulfonyl halides, particularly benzenesulfonyl halides having up to and including 10 carbon atoms, e.g., benzenesulfonyl chloride, toluenesulfonyl chloride, toluenesulfonyl bromide, para-ethylbenzenesulfonyl chloride, para-propylbenzenesulfonyl chloride, para-isopropylbenzenesulfonyl chloride, para-butylbenzenesulfonyl chloride; alkylsulfonyl halides containing up to and including 10 carbon atoms, e.g., methanesulfonyl chloride, ethanesulfonyl chloride, propanesulfonyl chloride, hexanesulfonyl chloride, octanesulfonyl chloride; aralkylsulfonyl halides containing up to and including 10 carbon atoms, e.g., phenylethanesulfonyl chloride, the corresponding bromides thereof, and the like.

If the reagent used is the anhydride of a hydrocarbon carboxylic acid, acetic, propionic, butyric, valeric, isovaleric, hexanoic, octanoic, decanoic, lauric, benzoic phenylacetic, or phenylpropionic anhydrides may be used.

In the preferred embodiment of this invention, an organic sulfonyl chloride is used, such as toluenesulfonyl chloride, with a solvent capable of accepting hydrogen halide such as pyridine, lutidine, piperidine, and the like or a neutral solvent containing a small amount of base, for example, methanol, ethanol, propanol, tertiary-butyl alcohol, with a small amount of triethylamine. The reaction is generally carried out at low temperature such as between minus 10 and plus 15° C. However, the reaction is operative between minus 50 and plus 75° C. The reaction period in the preferred embodiment, which includes low temperature reaction, pyridine as a solvent, and toluenesulfonyl chloride or methanesulfonyl chloride as reagent, is between 6 and 48 hours. At higher temperatures the reaction time is, of course, reduced. At the termination of the reaction, the material is recovered by conventional methods, such as pouring the reaction mixture into excess water, extracting with a water-immiscible reagent, such as methylene chloride, chloroform, benzene or the like, followed by evaporation to obtain the crude product. The crude product can be purified by conventional methods such as recrystallization, chromatography, extraction and partition methods with solvents, and the like.

When an acid anhydride is used for lactonization, no solvent is required. The steroid, a 16-hydroxy-trans-17(20)-pregnen-21-oic acid, is heated with the acid anhydride for a period of 1 to 48 hours. If acetic anhydride is used, the heating is performed at the reflux temperature of the reaction mixture (B.P. of acetic anhydride is 139.6°). Heating with other anhydrides can be carried out until temperatures of 225° are reached. The reactions can also be performed at lower temperatures, e.g., 50° C., but the reaction time will be increased. Reaction time at the temperature of boiling acetic anhydride was approximately between 6 to 48 hours. At the termination of the reaction, the product is generally recovered by evaporating in vacuo the acid anhydride. The crude material which remains may be purified by conventional methods such as recrystallization, chromatography, solvent distribution methods and the like.

The following examples are illustrative of the process and products of the present invention, but are not to be construed as limiting.

EXAMPLE 1.—3,11-DIKETO - 16β - HYDROXY-1,4,17 (20)-PREGNATRIEN-21-OIC ACID γ-LACTONE

A. *Methyl 3,11 - diketo-16α-hydroxy-cis-1,4,17(20)-pregnatrien - 21-oate and methyl 3,11-diketo-16β-hydroxy-trans-1,4,17(20)-pregnatrien-21-oate*

A reaction mixture of 50 g. of methyl 3,11-diketo-cis-4,17(20)-pregnadien-21-oate, 50 g. of selenium dioxide, 1500 ml. of t-butyl alcohol and 5 ml. of acetic acid was heated to reflux in a nitrogen atmosphere for a period of 24 hours. The reaction mixture was thereupon allowed to cool and was then filtered through a layer of diatomaceous earth (Celite) and magnesium silicate. The filter cake was washed carefully with ethyl acetate and the filtrate and washings combined and evaporated to dryness. The ethyl acetate solution was washed successively with aqueous sodium bicarbonate solution, freshly prepared ice-cold ammonium sulfide solution, aqueous dilute ammonia, aqueous dilute hydrochloric acid, aqueous sodium bicarbonate and water. The washings were discarded and the organic layer was dried over sodium sulfate and evaporated to dryness in vacuo. The crude material (51 g.) was dissolved in methylene chloride and chromatographed over 1500 g. of Florisil, the column being eluted with increasing percentages of acetone in Skellysolve B hexane solutions. Two main peaks were observed:

(1) Eluted first from the chromatogram: 13.4 g. of material, which upon crystallization from acetone-Skellysolve B hexanes gave 10 g. of material of melting point 205–207° C. (first crop); and 2 g. of material of melting point 197–199° C. (second crop). This material (first crop) was recrystallized from acetone and Skellysolve B hexanes to give methyl 16β-hydroxy-3,11-diketo-trans-1,4,17(20)-pregnatrien-21-oate of melting point 206–208° C. and having the following analysis and physical constants:

*Anal.*—Calcd. for $C_{22}H_{26}O_5$: C, 71.33; H, 7.08. Found: C, 70.87; H, 7.25.

$$\lambda_{max.}^{EtOH}, 231\ m\mu,\ \epsilon\ 22,400;\ \frac{A_{231}}{A_{251}}=1.61$$

(2) The material later eluted: 18.1 g., which was recrystallized from acetone-Skellysolve B hexanes to give 8.6 g. of material melting at 241–246° C. Further purification by recrystallization from acetone-Skellysolve B hexanes gave material having a melting point of 225–258° C., and analysis and physical constants as follows:

*Anal.*—Calcd. for $C_{22}H_{26}O_5$: C, 71.33; H, 7.08. Found: C, 71.00; H, 7.21.

$$\lambda_{max.}^{EtOH}\ 233\ m\mu;\ \epsilon\ 20,800;\ \frac{A_{233}}{A_{253}}=1.68$$

This material was methyl 3,11-diketo - 16α - hydroxy-cis-1,4,17(20)-pregnatrien-21-oate.

B. *3,11-diketo-16β-hydroxy-trans-1,4,17(20)-pregnatrien-21-oic acid*

A solution containing 1.0 g. of methyl 3,11-diketo-16β-hydroxy-trans-1,4,17(20)-pregnatrien-21-oate in 35 ml. of methanol to which had been added a solution containing 1.0 g. of potassium hydroxide in 10 ml. of water was refluxed under a nitrogen atmosphere for 3½ hours. The mixture was cooled and 200 ml. of water and 50 ml. of methylene chloride were added thereto. The aqueous phase, after separation from the organic phase, was acidified with dilute hydrochloric acid, whereupon a precipitate of 3,11-diketo - 16β-hydroxy-trans-1,4,17(20)-pregnatrien-21-oic acid formed which was extracted with several portions of ethyl acetate. The ethyl acetate extracts were combined, dried over anhydrous sodium sulfate, and evaporated to dryness in vacuo to give 0.987 g. of a residue which upon crystallization from methanol yielded 0.49 g. of 3,11-diketo - 16β-hydroxy-trans-1,4,17(20)-pregnatrien-21-oic acid having a melting point of 250–253° C. A portion was recrystallized a second time from methanol to yield an analytical sample of 3,11-diketo-16β-hydroxy-trans - 1,4,17(20)-pregnatrien-21-oic acid having a melting point of 250–254° C., $$\lambda_{max.}^{EtOH}\ 230\ m\mu$$

and the following analysis:

*Anal.*—Calcd. for $C_{20}H_{24}O_5$: C, 70.76; H, 6.79. Found: C, 70.07; H, 7.03.

C. *3,11-diketo-16β-hydroxy-1,4,17(20)-pregnatrien-21-oic acid γ-lactone*

To a solution of 3.0 g. of 3,11-diketo-16β-hydroxy-trans-1,4,17(20)-pregnatrien-21-oic acid in 20 ml. of pyridine, cooled to 0–5° C., there was added 3.0 g. of tosyl chloride. The reaction was then allowed to proceed for 18 hours at 5° C. The reaction mixture was poured into ice-water and the organic material was extracted with several portions of methylene chloride. The extracts were combined, washed with dilute hydrochloric acid, sodium bicarbonate solution and water, and dried over anhydrous sodium sulfate, following which the solvent was removed to give a residue. The residue was taken up in methylene chloride and poured onto a chromatographic column containing 400 g. of Florisil (synthetic magnesium silicate) packed wet in Skellysolve B commercial hexanes. The chromatographic column was developed by eluting with commercial hexanes containing increasing amounts of acetone (commercial hexanes 50% acetone:50% commercial hexanes). The main peak fractions were combined and crystallized from methanol to give two crops of 3,11-diketo-16β-hydroxy-1,4,17(20)-pregnatrien-21-oic acid γ-lacetone, the first weighing 1.57 g. and having a melting point of 203–205° C. and the second weighing 0.14 g. A sample of material from the first crop had infrared absorption bands (Nujol) at 1770, 1745, 1710, 1670, 1630, 1610, 1235, 1155, 1120, and 1070 cm.$^{-1}$.

EXAMPLE 2.—3,11 - DIKETO - 16β - HYDROXY-1,4,17(20) - PREGNATRIEN-21-OIC ACID γ-LACTONE AND 3,11 - DIKETO - 16α - HYDROXY-1,4,17(20) - PREGNATRIEN-21-OIC ACID γ-LACTONE

A mixture of 5.1 g. of 3,11-diketo-16β-hydroxy-trans-1,4,17(20)-pregnatrien-21-oic acid and 250 ml. of acetic anhydride was refluxed under a nitrogen atmosphere for 18 hours. After cooling, the acetic anhydride was removed in vacuo by means of a rotary evaporator, with toluene being used to remove the last traces of acetic anhydride. The thus-produced residue was obtained, taken up in methylene chloride and poured onto a chromatographic column containing 500 g. of Florisil (anhydrous magnesium silicate) packed wet in commercial hexanes. The chromatographic column was developed by eluting with commercial hexanes containing increasing amounts of acetone. The main crystalline peak (2.54 g.) which was obtained was recrystallized from methanol to yield 0.49 g. of 3,11-diketo - 16α - hydroxy-1,4,17(20)-pregnatrien-21-oic acid γ-lactone having a melting point of 265–267° C. The mother liquors from the methanol crystallization yielded 0.12 g. of 3,11-diketo-16β-hydroxy-1,4,17(20)-pregnatrien-21-oic acid γ-lactone having a melting point of 207–212° C. and an infrared spectrum identical with the product of Example 1. An analytical sample of 3,11-diketo - 16α-hydroxy-1,4,17(20)-pregnatrien-21-oic acid γ-lactone, obtained by further crystallization from methanol had a melting point of 270–273° C., and the following analysis:

*Anal.*—Calcd. for $C_{21}H_{22}O_4$: C, 74.53; H, 6.55. Found: C, 74.13; H, 6.66.

In the manner given in Example 1C, 3,11-dioxo-16β-hydroxy-trans-1,4,17(20)-pregnatrien-21-oic acid can be converted to the lactone by treating 3,11-dioxo-16β-hydroxy-trans-1,4,17(20)-pregnatrien-21-oic acid with other organic sulfonyl chlorides, such as methanesulfonyl chloride, ethanesulfonyl chloride, propanesulfonyl chloride, p-ethybenzenesulfonyl chloride, p-propylbenzenesulfonyl choride, or the corresponding bromides in pyridine solution at a temperature between minus 5 and plus 10° C.

In the same manner given in Example 2, 3,11-dioxo-16β-hydroxy-trans-1,4,17(20)-pregnatrien-21-oic acid can be refluxed with propionic anhydride or heated to 150° in other anhydrides such as butyric anhydride, valeric anhydride, hexanoic anhydride, benzoic anhydride, phenylacetic anhydride, phenylpropionic anhydride, or the like to give a mixture of 3,11-dioxo-16β-hydroxy-1,4,17(20)-pregnatrien-21-oic acid γ-lactone and 3,11-dioxo-16α-hydroxy-1,4,17(20)-pregnatrien-21-oic acid γ-lactone.

EXAMPLE 3.—3,11 - DIKETO - 16α - HYDROXY-1,4,17(20) - PREGNATRIEN-21-OIC ACID γ-LACTONE

A. *Methyl 16α-hydroxy - 3,11-diketo-trans-1,4,17(20)-pregnatrien - 21 - oate and methyl 3,11 - diketo-trans-1,4,17(20)-pregnatrien-21-oate*

A solution was prepared containing 107 g. of methyl 3,11-diketo-cis-4,17(20)-pregnadien-21-oate in 1750 ml. of methanol and 250 ml. of methanolic 25% sodium hydroxide solution. The reaction mixture was heated to reflux for 2 hours in a nitrogen atmosphere. At the end of this period the methanol was removed in vacuo and the residue taken up in methylene chloride. The organic solution was washed with water until neutral and the aqueous layer was back-extracted with methylene chloride. The methylene chloride solution and washes were combined, dried over anhydrous sodium sulfate, and the solvent (methylene chloride) was removed to give 95.6 g. of crude product. The crude product was dissolved in 250 ml. of methylene chloride and chromatographed over 1500 g. of Florisil anhydrous magnesium silicate using Skellysolve B hexanes and acetone, up to 25%, as diluent. The main crystalline fractions were combined and recrystallized from acetone and Skellysolve B hexanes to give 51.4 g. of methyl 3,11-diketo-trans-4,17(20)-pregnadien-21-oate having a melting point of 144–146° C. In a second crop 15 g. of the same material was obtained having a melting point of 140–143° C.

A reaction mixture was prepared containing 25 g. of methyl 3,11-diketo-trans-4,17(20)-pregnadien-21-oate of melting point 144–146° C., 750 ml. of t-butyl alcohol, 2.5 ml. of acetic acid and 25 g. of selenium dioxide. This reaction mixture was heated to reflux for a period of 18 hours under nitrogen. After cooling, the mixture was filtered through diatomaceous earth (Celite) and magnesium silicate. The filter cake was washed with ethyl acetate and the filtrate and washings were combined. The filtrate was thereupon evaporated to dryness and the residue was taken up in ethyl acetate which was washed successively with sodium bicarbonate solution, freshly prepared ice-cold ammonium sulfide solution, aqueous dilute ammonia, aqueous dilute hydrochloric acid, aqueous sodium bicarbonate solution and water. The remaining organic layer was dried over sodium sulfate and evaporated to dryness in vacuo. The crude material was dissolved in methylene chloride and chromatographed over 1500 g. of Florisil anhydrous magnesium silicate using gradient elution with Skellysolve B hexanes to 50% acetone-50% Skellysolve B hexanes. Two peaks were obtained:

(1) Eluted first from the chromatogram: 6.655 g. of material which upon recrystallization was shown to be the 1-dehydro derivative of the starting material, namely, methyl 3,11-diketo-trans-1,4,17(20)-pregnatrien-21-oate, having, after recrystallization from acetone and Skellysolve B hexanes, a melting point of 149–151° C.

(2) The second peak gave 9.19 g. of crude material, which after several crystallizations from ether and thereupon from acetone and Skellysolve B, gave methyl 16α-hydroxy - 3,11 - diketo-trans-1,4,17(20)-pregnatrien-21-oate of melting point 164–167° C. and an analysis as follows:

*Anal.*—Calcd. for $C_{22}H_{26}O_5$: C, 71.33; H, 7.08. Found: C, 70.03; H, 6.83.

B. *Methyl 3,11-diketo-16α-hydroxy-trans-1,4,17(20)-pregnatrien-21-oate 16-tetrahydropyranyl ether*

2.03 g. of methyl 3,11-diketo-16α-hydroxy-trans-1,4,17 (20)-pregnatrien-21-oate, 10 ml. of benzene, 5 ml. of dihydropyran and 50 mg. of p-toluenesulfonic acid monohydrate was stirred at room temperature for 4 hours. The reaction mixture was washed with sodium bicarbonate solution, water, dried over sodium sulfate, and evaporated in vacuo to yield an oil comprising methyl 3,11-diketo - 16α - hydroxy-trans-1,4,17(20)-pregnatrien-21-oate 16-tetrahydropyranyl ether.

Instead of p-toluenesulfonic acid monohydrate, other acid catalysts may be used in the above reaction, such as mineral acids, e.g., sulfuric acid, hydrogen chloride, and the like, or preferably other organic sulfonic acids such as arylsulfonic acids, e.g., benzenesulfonic, o-, m-, p-chlorobenzenesulfonic acids, p-ethylbenzenesulfonic acid, p-isopropylsulfonic acid, and the like, and alkylsulfonic acids, e.g., methanesulfonic, ethanesulfonic, propanesulfonic acid and the like.

C. *3,11-diketo-16α-hydroxy-trans-1,4,17(20)-pregnatrien-21-oic acid 16-tetrahydropyranyl ether*

The oil comprising methyl 3,11-diketo-16α-hydroxy-trans-1,4,17(20)-pregnatrien - 21 - oate 16-tetrahydropyranyl ether, obtained in Example 3B, was heated in 30 ml. of dioxane with 3.0 g. of potassium hydroxide in 30 ml. of water for 30 minutes. The reaction mixture was cooled, 300 ml. of water was added, and extracted with methylene chloride. The aqueous layer was cooled to 0° C. by adding excess ice, acidified with hydrochloric acid, and extracted with several portions of methylene chloride. The combined extracts were washed with water, dried over sodium sulfate and evaporated to dryness in vacuo to yield an oil comprising 3,11-diketo-16α-hydroxy-trans-1,4,17(20)-pregnatrien - 21 - oic acid 16-tetrahydropyranyl ether.

Instead of hydrolyzing with potassium hydroxide as shown in Example 3C, other alkali-metal bases can be used, e.g., sodium and lithium hydroxide, carbonates of potassium or sodium, bicarbonates of potassium or sodium, sodium ethylate and the like. The free steroid acid can also be obtained by treating its alkali base salt, first obtained in the above hydrolysis, with a mineral acid other than hydrochloric acid. Mineral acids which can be used in the above reaction include: sulfuric acid, perchloric acid, chloric acid, hydrogen bromide and iodide, nitric acid, and the like.

D. *3,11-diketo-16α-hydroxy-trans-1,4,17(20)-pregnatrien-21-oic acid*

The oil comprising 3,11-diketo - 16α - hydroxy-trans-1,4,17(20)-pregnatrien-21-oic acid 16-tetrahydropyranyl ether, obtained in Example 3C, was dissolved in 50 ml. of tetrahydrofuran and allowed to stand 18 hours at room temperature with 3 ml. of 25% aqueous sulfuric acid. The tetrahydrofuran was then removed by evaporation in vacuo from the reaction mixture leaving a residue which was then extracted with several portions of methylene chloride. The extracts were combined, washed with water until neutral, dried over anhydrous sodium sulfate and the solvent was removed in vacuo to give a crystalline residue which was crystallized from methanol and then from acetone: Skellysolve B (commercial hexanes) to yield 0.72 g. of 3,11-diketo-16α-hydroxy-trans-1,4,17(20)-pregnatrien - 21 - oic acid having a melting point of 173–179° C. A portion was further recrystallized from acetone-methanol to yield an analytical sample of 3,11-diketo-16α-hydroxy-trans-1,4,17(20)-pregnatrien-21-oic acid having a melting point of 170–174° C.

E. *3,11-diketo-16α-hydroxy-1,4,17(20)-pregnatrien-21-oic acid γ-lactone*

1.68 g. of 3,11-diketo-16α-hydroxy-trans-1,4,17(20)-pregnatrien-21-oic acid and 18 ml. of acetic anhydride was refluxed under a nitrogen atmosphere for 18 hours.

The acetic anhydride was removed by evaporation in vacuo, with toluene being used to remove the last traces of acetic anhydride. This procedure yielded a residue which was crystallized directly from methanol and washed with ether to give 1.12 g. of 3,11-diketo-16α-hydroxy-1,4,17(20)-pregnatrien-21-oic acid γ-lactone having a melting point of 255–260° C. and an infrared spectrum identical with that of the 16α-hydroxy γ-lactone obtained in Example 2.

EXAMPLE 4.—3,11-DIKETO - 16α - HYDROXY-4,17(20)-PREGNADIEN-21-OATE γ-LACTONE

A. *Methyl 16α - hydroxy-3,11-diketo-trans-4,17(20)-pregnadien-21-oate*

A reaction mixture of 10 g. of methyl 3,11-diketo-trans-4,17(20)-pregnadien-21-oate, 400 ml. of tetrahydrofuran and 8 g. of selenium dioxide was stirred and refluxed in a nitrogen atmosphere for 4 hours. The reaction mixture was cooled and then filtered through a layer of diatomaceous earth (Celite). The filter cake was washed with 50 ml. of ethyl acetate and the washings added to the filtrate. The combined filtrate and washings were exaporated in vacuo. The residue thus obtained was redissolved in 400 ml. of ethyl acetate. This solution was washed with freshly prepared, ice-cold ammonium polysulfide, dilute aqueous ammonia, cold dilute hydrochloric acid, water, saturated sodium bicarbonate solution and then dried over anhydrous sodium sulfate. The thus-obtained mixture was evaporated to dryness, and twice recrystallized to give methyl 3,11-diketo-16α-hydroxy-trans-4,17(20)-pregnadien-21-oate.

B. *Methyl 3,11-diketo-16α-hydroxy-trans-4,17(20)-pregnadien-21-oate-16-tetrahydropyranyl ether*

Two grams of methyl 3,11-diketo-16α-hydroxy-trans-4,17(20)-pregnadien-21-oate, 10 ml. of benzene, 5 ml. of dihydropyran and 50 mg. of p-toluenesulfonic acid monohydrate was stirred at room temperature for 4 hours. The reaction mixture was washed with sodium bicarbonate solution, water, dried over sodium sulfate, and evaporated in vacuo to yield an oil product comprising methyl 3,11 - diketo - 16α - hydroxy - trans - 4,17(20) - pregnadien-21-oate 16-tetrahydropyranyl ether.

C. *3,11-diketo-16α-hydroxy-trans-4,17(20)-pregnadien-21-oic acid 16-tetrahydropyranyl ether*

Methyl 3,11-diketo-16α-hydroxy-trans-4,17(20)-pregnadien-21-oate 16-tetrahydropyranyl ether, obtained in Example 4B, was heated in 30 ml. of dioxane with 3.0 g. of potassium hydroxide in 30 ml. of water for 30 minutes. The reaction mixture was cooled, 300 ml. of water was added, and extracted with methylene chloride. The aqueous layer was cooled to 0° C. by adding excess ice, acidified with hydrochloric acid, and extracted with several portions of methylene chloride. The combined extracts were washed with water, dried over sodium sulfate and evaporated to dryness in vacuo to yield an oil comprising 3,11-diketo-16α-hydroxy-trans-4,17(20)-pregnadien-21-oic acid 16-tetrahydropyranyl ether.

D. *3,11-diketo-16α-hydroxy-trans-4,17(20)-pregnadien-21-oic acid*

The 2,11 - diketo - 16α-hydroxy-trans-4,17(20)-pregnadien-21-oic acid 16-tetrahydropyranyl ether, obtained in Example 4C, was dissolved in 50 ml. of tetrahydrofuran and allowed to stand 18 hours at room temperature with 3 ml. of 25% aqueous sulfuric acid. The tetrahydrofuran was then removed by evaporation in vacuo from the reaction mixture leaving a residue which was then extracted with several portions of methylene chloride. The extracts were combined, washed with water until neutral, dried over anhydrous sodium sulfate and the solvent was removed in vacuo to give a crystalline residue which was crystallized from methanol and then from acetone:Skellysolve B (commercial hexanes) to yield 3,11-diketo-16α-hydroxy-trans-4,17(20)-pregnadien-21-oic acid.

E. *3,11-diketo-16α-hydroxy-4,17(20)-pregnadien-21-oic acid γ-lactone*

1.5 g. of 3,11-diketo-16α-hydroxy-trans-4,17(20)-pregnadien-21-oic acid and 17 ml. of acetic anhydride was refluxed under a nitrogen atmosphere for 18 hours. The acetic anhydride was removed by evaporation in vauco, with toluene being used to remove the last traces of acetic anhydride. This procedure yielded a residue which was crystallized directly from methanol and washed with ether to give 1.12 g. of 3,11-diketo-16α-hydroxy-4,17(20)-pregnadien-21-oic acid γ-lactone.

EXAMPLE 5.—3β,16β-DIHYDROXY-11-KETO-5α, 17(20)-PREGNEN-21-OIC ACID γ-LACTONE

A. *Methyl 3β,16β - dihydroxy - 11 - keto - 5α - trans - 17(20) - pregnen - 21 - oate 3 - acetate and methyl 3β, 16α - dihydroxy - 11 - keto - 5α - cis - 17(20) - pregnen-21 - oate 3 - acetate*

Methyl 3β - acetoxy - 11 - keto - 5α - cis - 17(20)-pregnen-21-oate was prepared from methyl 3β-hydroxy-11-keto-5α-cis-17(20)-pregnen-21-oate (40 g.) by treating with 100 ml. of acetic anhydride in 200 ml. of pyridine and heating this mixture on the steam bath for 30 minutes. A total of 32.8 g. of methyl 3β-acetoxy-11-keto-5α-cis-17(20)-pregnen-21-oate was obtained having a melting point of 128–133° C.

A solution was prepared containing 5 g. of methyl 3β-acetoxy-11-keto-5α-cis-17(20)-pregnen-21-oate and 150 ml. of t-butyl alcohol. This solution was stirred and refluxed in a nitrogen atmosphere for 18 hours in the presence of 5 g. of selenium dioxide and 0.5 ml. of acetic acid. The reaction mixture was then cooled to room temperature and filtered through a bed of Celite diatomaceous earth. The residue was rinsed with a little ethyl acetate. The filtrate and washings were concentrated to nearly dryness by distillation in vacuo from steam baths. The residue was taken up in ethyl acetate and washed successively with 2% sodium bicarbonate solution, fresh ice-cold ammonium polysulfide, aqueous dilute ammonia, aqueous ice-cold hydrochloric acid, aqueous saturated sodium bicarbonate solution and water. The washed extract was dried over anhydrous sodium sulfate and concentrated to an off-white crystalline mass by distillation in water. This crystalline residue was redissolved in methylene chloride and chromatographed over 300 g. of Florisil. The column was developed with 100-ml. portions as follows: 10 fractions each of 10%, 15% and 20% acetone, respectively, in Skellysolve B hexanes. Fractions 13 to 23, eluted with 10% and 15% acetone, represented a peak of 2.91 g. of material, which was recrystallized from acetone-Skellysolve B to give 2.0 g. of white needles of melting point of 227–231° C. representing methyl 3β,16β-dihydroxy - 11 - keto - 5α - trans - 17(20) - pregnen - 21 - oate 3-acetate. The analysis of this material is as follows:

*Analysis.*—Calcd. for $C_{24}H_{34}O_6$: C, 70.55; H, 8.39. Found: C, 69.15; H, 8.23.

Fractions 26 to 33, inclusive, eluted with 20% acetone in Skellysolve B hexanes represented a peak of 1.14 g. of material, which when recrystallized from acetone-Skellysolve B gave 0.73 g. of white crystalline plates of melting point 182–185° C., representing methyl 3β,16α-dihydroxy - 11 - keto - 5α - cis - 17(20) - pregnen - 21 - oate 3-acetate. Analysis of this material is as follows:

*Analysis.*—Calcd. for $C_{24}H_{34}O_6$: C, 70.55; H, 8.39. Found: C, 70.10; H, 8.43.

B. 3β,16β-dihydroxy-11-keto-5α-trans-17(20)-pregnen-21-oic acid

A mixture of 2.0 g. of methyl 3β,16α-dihydroxy-11-keto-5α-trans-17(20)-pregnen-21-oate 3-actetate in 20 ml. of methanol to which had been added 2.0 g. of potassium hydroxide in 8 ml. of water was refluxed under a nitrogen atmosphere for 3½ hours. The thus-obtained reaction mixture was cooled, 200 ml. of water was added thereto followed by the addition of 20 ml. of dilute hydrochloric acid. The acidified reaction mixture was extracted with several portions of ethyl acetate. The extracts were combined, washed with water until neutral, dried over sodium sulfate and evaporated to dryness in vacuo to give 2.04 g. of a residue comprising 3β,16β-dihydroxy-11-keto-5α-trans-17(20)-pregnen-21-oic acid.

C. 3β,16β-dihydroxy-11-keto-5α,17(20)-pregnen-21-oic acid γ-lactone

The 2.04 g. of residue comprising 3β,16β-dihydroxy-11-keto-5α-trans-17(20)-pregnen-21-oic acid, obtained in Example 5B, was dissolved in 56 ml. of pyridine and the solution cooled to 0° C. in an ice bath. 1.1 g. (1 equivalent) of tosyl chloride was added over a 20-minute period whilst stirring, following which stirring was continued for another hour. The reaction mixture was then kept at a temperature of 0–5° C. for 18 hours following which it was poured into ice water and then extracted with several portions of ethyl acetate. The extracts were combined, washed with dilute hydrochloric acid, sodium bicarbonate solution and water, dried over magnesium sulfate, followed by removal of the solvent by evaporation in vacuo. Crystallization from acetone:commercial hexanes yielded 0.58 g. of 3β,16β-dihydroxy-11-keto-5α,17(20)-pregnen-21-oic acid γ-lactone having a melting point of 260–274° C. and infrared absorption bands (Nujol) at 3460, 1780, 1733, 1700, 1640, 1165, 1125, 1080, 1040, and 1015 cm.$^{-1}$.

EXAMPLE 6.—5α,16β-DIHYDROXY-6β-METHYL-3,11-DIKETO-17(20)-PREGNEN-21-OIC ACID γ-LACTONE 3-CYCLIC ETHYLENE ACETAL

A. Methyl 3,11-diketo-5α,16-dihydroxy-6β-methyl-trans-17(20)-pregnen-21-oate 3-cyclic ethylene acetal and methyl 3,11-diketo-5α,16α-dihydroxy-6β-methyl-cis-17(20)-pregnen-21-oate 3-cyclic ethylene acetal In a round-bottomed flask of 1 liter, 10 g. of methyl 3,11-diketo-5α-hydroxy-6β-methyl-cis-17(20)-pregnen-21-oate 3-ethylene acetal, 10 g. of selenium dioxide, and 400 ml. of tetrahydrofuran were placed. This mixture was stirred and refluxed for a period of 6 hours. Thereafter the reaction mixture was cooled to room temperature and filtered through a pad of Celite diatomaceous earth. The Celite pad was washed with 300 ml. of ethyl acetate. The filtrate was diluted with 1700 ml. of water. The mixture was thereupon extracted with three 300-ml. portions of ethyl acetate, using as the first portion the 300 ml. of ethyl acetate used in the washing of the Celite pad. The ethyl acetate extracts were thereupon combined, washed with water and dried over anhydrous sodium sulfate. The filtrate was thereupon filtered to remove particles of the drying agent and distilled in a 2 liter round-bottomed flask fitted with a stirrer and a condenser for distillation. Ten grams of Darco (activated charcoal) were added. The distillation was continued under stirring until about 400 ml. of the reaction mixture remained in the flask. This material was allowed to cool and was thereupon filtered through Celite diatomaceous earth, and the thus-obtained filtrate was concentrated to dryness at 50° C. under reduced pressure. The obtained residue was dissolved in 600 ml. of methylene chloride and chromatographed over a column containing 300 g. of Florisil, taking fractions of 600 ml. as follows:

| Fraction No. | Solvent | Wt. Res., g. | |
|---|---|---|---|
| 1 | CH$_2$Cl$_2$ | .219 | |
| 2 | Skellysolve B hexanes + 5% acetone | .066 | |
| 3 | do | .803 | |
| 4 | do | 1.043 | |
| 5 | do | .964 | A |
| 6 | do | .785 | 5.651 |
| 7 | Skellysolve B hexanes + 7.5% acetone | 1.140 | |
| 8 | do | .630 | |
| 9 | do | .286 | |
| 10 | do | .127 | |
| 11 | do | .090 | |
| 12 | Skellysolve B hexanes + 10% acetone | .117 | |
| 13 | do | .145 | |
| 14 | do | .146 | |
| 15 | do | .083 | |
| 16 | do | .440 | B |
| 17 | Skellysolve B hexanes + 15% acetone | 1.054 | 3.139 |
| 18 | do | .956 | |
| 19 | do | .586 | |
| 20 | do | .281 | |
| 21 | do | .117 | |
| 22 | Acetone | .440 | |
| 23 | do | .008 | |

Fraction A was recrystallized from acetone to yield 5.57 g. of methyl 3,11-diketo-5α,16β-dihydroxy-6β-methyl-trans-17(20)-pregnen-21-oate 3-ethylene acetal having a melting point of 190–194° C. (54% yield). A further purified analytical sample crystallized from acetone had a melting point of 192–194° C. and a rotation [α]$_D$ +36° in chloroform.

Fraction B was recrystallized from acetone-Skellysolve B hexanes to yield 2.50 g. (24% yield) of methyl 3,11-diketo-5α,16α-dihydroxy-6β-methyl-cis-17(20)-pregnen-21-oate 3-cyclic ethylene acetal of melting point 205–210° C., which, when recrystallized from acetone, gave a sample melting at 213–215° C. having a rotation [α]$_D$ of −9° in chloroform.

B. 3,11-diketo-5α,16β-dihydroxy-6β-methyl-trans-17(20)-pregnen-21-oic acid 3-cyclic ethylene acetal In the manner given in Example 1B, methyl 3,11-diketo-5α,16β-dihydroxy-6β-methyl-trans-17(20)-pregnen-21-oate 3-cyclic ethylene acetal was hydrolyzed with potassium hydroxide in methanol solution to give 3,11-diketo-5α,16β-dihydroxy-6β-methyl-trans-17(20)-pregnen-21-oic acid 3-cyclic ethylene acetal.

C. 3,11-diketo-5α,16β-dihydroxy-6β-methyl-17(20)-pregnen-21-oic acid γ-lactone 3-cyclic ethylene acetal In the manner given in Example 1C, 3,11-diketo-5α,16β-dihydroxy 6β-methyl-trans-17(20)-pregnen-21-oic acid 3-cyclic ethylene acetal in pyridine solution was treated with tosyl chloride to give 3,11-diketo-5α,16β-dihydroxy-6β-methyl-17(20)-pregnen-21-oic acid γ-lactone 3-cyclic ethylene acetal.

EXAMPLE 7.—3,11-DIKETO-5α,16β-DIHYDROXY-6β-FLUORO-17(20)-PREGNEN-21-OIC ACID γ-LACTONE 3-CYCLIC ETHYLENE ACETAL

A. Methyl 3,11-diketo-5α,16β-dihydroxy-6β-fluoro-trans-17(20)-pregnen-21-oate 3-cyclic ethylene acetal and methyl 3,11-diketo-5α,16α-dihydroxy-6β-fluoro-cis-17(20)-pregnen-21-oate 3-cyclic ethylene acetal Into a round-bottomed 1 liter flask fitted with a stirrer and a condenser was placed 10 g. of methyl 3,11-diketo-5α-hydroxy-6β-fluoro-cis-17(20)-pregnen-21-oate 3-cyclic ethylene acetal, 10 g. of selenium dioxide and 400 ml. of tetrahydrofuran. The mixture was refluxed with stirring for a period of 6 hours. Thereafter, the reaction mixture was allowed to cool to room temperature and was then filtered through a pad of Celite diatomaceous earth. The Celite filter was washed with 300 ml. of ethyl acetate. The filtrate was diluted with 1700 ml. of water and the aqueous reaction mixture was extracted with three 300-ml. portions of ethyl acetate using as the first portion the ethyl acetate washings of the Celite filter. The ethyl acetate extracts were then combined, washed with water and dried over anhydrous sodium sulfate. Thereafter, the extracts were filtered and the filtrate placed in a 2 liter round-bottomed flask fitted with a stirrer and condenser for distillation. Ten grams of Darco G-60 (activated charcoal) was added to the reaction flask. The reaction mixture was then distilled under stirring until about 400 ml. remained in the flask. The 400 ml. were allowed to cool and were then filtered through Celite to remove the charcoal and the thus-obtained filtrate was concentrated to dryness at 50° C. under reduced pressure. The thus-obtained solid was dissolved in 600 ml. of methylene chloride and chromatographed over a column containing 300 g. of Florisil. Fractions of 600 ml. were taken as follows:

| Fraction No. | Solvent | Wt. Res., g. | |
|---|---|---|---|
| 1 | CH$_2$Cl$_2$ | .163 | |
| 2 | Skellysolve B hexanes + 5% acetone | .017 | |
| 3 | do | .323 | |
| 4 | do | 1.014 | |
| 5 | do | .807 | |
| 6 | do | .950 | A |
| 7 | Skellysolve B hexanes + 7.5% acetone | 1.324 | 5.115 |
| 8 | do | .718 | |
| 9 | do | .302 | |
| 10 | do | .106 | |
| 11 | do | .080 | |
| 12 | Skellysolve B hexanes + 10% acetone | .127 | |
| 13 | do | .129 | |
| 14 | do | .230 | |
| 15 | do | .402 | |
| 16 | do | .656 | |
| 17 | Skellysolve B hexanes + 15% acetone | 1.083 | B |
| 18 | do | .639 | 3.250 |
| 19 | do | .342 | |
| 20 | do | .138 | |
| 21 | do | .077 | |
| 22 | Acetone | .421 | |
| 23 | do | .002 | |

Fraction A was crystallized from acetone to give in two yields 4.28 g. (41%) of methyl 3,11-diketo-5α,16β-dihydroxy - 6β - fluoro - trans - 17(20) - pregnen - 21-oate 3-cyclic ethylene acetal, having a melting point of 228–236° C. An analytical sample recrystallized from acetone had a melting point of 234–235° C. and a rotation [α]$_D$ +24° in acetone.

Fraction B contained methyl 3,11-diketo-5α,16α-dihydroxy - 6β - fluoro - cis - 17(20) - pregnen - 21 - oate 3-cyclic ethylene acetal.

B. *3,11 - diketo - 5α,16β - dihydroxy - 6β - fluoro - trans-17(20)-pregnen-21-oic acid 3-cyclic ethylene acetal*

In the manner given in Example 1B, methyl 3,11-diketo-5α,16β - dihydroxy - 6β - fluoro - trans - 17(20) - pregnen-21-oate 3-cyclic ethylene acetal was hydrolyzed with potassium hydroxide in methanol solution to give the free acid, 3,11-diketo-5α,16β-dihydroxy-6β-fluoro-trans-17(20)-pregnen-21-oic acid 3-cyclic ethylene acetal.

C. *3,11 - diketo - 5α,16β - dihydroxy - 6β - fluoro - 17(20)-pregnen-21-oic acid γ-lactone 3-cyclic ethylene acetal*

In the manner given in Example 1C, 3,11-diketo-5α,16β-dihydroxy - 6β - fluoro-trans - 17(20) - pregnen - 21-oic acid 3-cyclic ethylene acetal was treated at 5° C. with methanesulfonyl chloride to give 3,11-diketo-5α,16β-dihydroxy-6β-fluoro-17(20)-pregnen-21-oic acid γ-lactone 3-cyclic ethylene acetal.

EXAMPLE 8.—3,11 - DIKETO - 16β - HYDROXY - 5α, 17(20)-PREGNEN-21-OIC ACID γ-LACTONE 3-CYCLIC ETHYLENE ACETAL

A. *Methyl 3,11 - diketo - 16β - hydroxy - 5α - trans - 17 (20) - pregnen - 21 - oate 3 - cyclic ethylene acetal and methyl 3,11 - diketo - 16α - hydroxy - 5α - cis - 17 (20)-pregnen-21-oate 3-cyclic ethylene acetal*

1. PREPARATION OF STARTING MATERIALS

Methyl 3β - hydroxy - 11 - keto - 5α - cis - 17(20)-pregnen-21-oate (20 g.) was dissolved in 500 ml. of acetone by warming on a steam bath. The solution was cooled to 12° C. with an ice bath and 14.2 ml. of Jones reagent (26.7 g. of chromic anhydride in 23 ml. concentrated sulfuric acid, diluted to 100 ml. with water) was added. The reaction mixture was kept at 15–20° C. for 15 minutes. The mixture was then diluted with 1200 ml. of ice-water and stirred for 45 minutes. The product was filtered by suction and washed 3 times by re-slurrying the material in deionized water and filtering the mixture. After drying to constant weight in vacuo at 40° C., 19 g. of methyl 3,11-diketo-5α-cis-17(20)-pregnen-21-oate of melting point 238–240° C. was obtained.

Nineteen grams of methyl 3,11-diketo-5α-cis-17(20)-pregnen-21-oate, as obtained above, were placed in a flask, fitted with a stirrer, a water trap and a reflux condenser. Two hundred milliliters of benzene, 0.5 g. of toluenesulfonic acid monohydrate, and 20 ml. of ethylene glycol were added and the mixture was stirred and refluxed for 6 hours. The mixture was then cooled and diluted with an aqueous 2% sodium bicarbonate solution cooled with ice. The benzene layer was separated and dried over anhydrous sodium sulfate. The dry benzene solution was concentrated by distillation in vacuo to leave a white crystalline residue. The crude residue was recrystallized from ether-Skellysolve B to give 17.34 g. as a first crop and 3 g. as a second crop of methyl 3,11-diketo - 5α - cis - 17(20) - pregnen - 21 - oate 3 - cyclic ethylene acetal. The melting point of this material (first crop) was 169–171° C.

2. THE 16-HYDROXYLATION

Five grams of methyl 3,11-diketo-5α-cis-17(20)-pregnen-21-oate 3-cyclic ethylene acetal was dissolved in 150 ml. of t-butyl alcohol. Five grams of selenium dioxide and 2 g. of sodium acetate was added and the resulting mixture was stirred and refluxed in a nitrogen atmosphere for 7 hours. The reaction mixture was worked up as in Example 6A.

The total crude crystalline product thus obtained was chromatographed over 300 g. of Florisil. The column was developed with 100-ml. portions of 10 fractions each of 10%, 15% and 20% acetone, the balance being Skellysolve B hexanes. A peak represented by fractions 12 to 23, inclusive, obtained by elution with 10% and 15% acetone in Skellysolve B hexanes, gave 2.35 g. of material which was recrystallized from acetone-Skellysolve B hexanes to give 1.44 g. of methyl 3,11-diketo-16β-hydroxy-5α-trans-17(20)-pregnen-21-oate 3-cyclic ethylene acetal of melting point 255–258° C. and an analysis as follows:

*Analysis.*—Calcd. for $C_{24}H_{34}O_6$: C, 68.87; H, 8.19. Found: C, 70.21; H, 8.44.

B. *3,11 - diketo - 16β - hydroxy - 5α - trans 17(20) - pregnen - 21 - oic acid 3 - cyclic ethylene acetal*

In the manner given in Example 1B, methyl 3,11-diketo-16β - hydroxy - 5α - trans - 17(20) - pregnen - 21 - oate 3-cyclic ethylene acetal was hydrolyzed in methanol with potassium hydroxide to give the free acid, 3,11-diketo-16β - hydroxy - 5α - trans - 17(20) - pregnen - 21 - oic acid 3-cyclic ethylene acetal.

C. *3,11 - diketo - 16β - hydroxy - 5α,17(20) - pregnen-21-oic acid γ-lactone 3-cyclic ethylene acetal*

In the manner given in Example 1C, 3,11-diketo-16β-hydroxy-5α-trans-17(20)-pregnen-21-oic acid 3-cyclic ethylene acetal was treated with ethanesulfonyl chloride to give 3,11 - diketo - 16β-hydroxy-5α,17(20)pregnen-21-oic acid γ-lactone 3-cyclic ethylene acetal.

EXAMPLE 9.—3α,16α - DIHYDROXY - 11 - KETO- 16β - METHYL - 5β,17(20) - PREGNEN - 21-OIC ACID γ-LACTONE

A. *Methyl 3α - hydroxy - 11 - keto - 16α - methyl - 5β- cis - 17(20) - pregnen - 21 - oate and methyl 3α - hydroxy - 11 - keto - 16α - methyl - 5β - trans - 17(20)- pregnen-21-oate and acetates*

A solution containing 44 g. of 3α-hydroxy-11-keto-16α- methyl-5β-pregnan-3,20-dione in 633 ml. of t-butyl alcohol was heated to 60° C. in a nitrogen atmosphere. To this solution was added 80 ml. of diethyl oxalate followed by 81 ml. of 27% methanolic sodium methoxide solution. After the addition the reaction mixture was allowed to cool to about 25–30° C. Then a mixture of 22 g. of sodium acetate, 22 ml. of acetic acid and 800 ml. of methanol was added. The mixture was cooled to 0° C. and thereupon a mixture of 37.6 g. of bromine in 350 ml. of methanol was added dropwise. After the bromine addition was completed, 300 ml. of 27% methanolic sodium methoxide was added and the reaction allowed to proceed for a period of 30 minutes at room temperature (about 25° C.). Acetic acid was then added until the pH was about 7. The organic layer was then partitioned between methylene chloride and water. After washing with water the methylene chloride extracts were dried over anhydrous sodium sulfate and evaporated to dryness in vacuo, to give a residue. This residue was dissolved in methylene chloride (100 ml.) and chromatographed on 1800 g. of Florisil anhydrous magnesium silicate. The chromatography was performed with gradient elution of Skellysolve B hexanes and 15% acetone:Skellysolve B hexanes. Two main peaks were obtained. The first eluate was 18.972 g. of methyl 3α - hydroxy-11-keto-16α-methyl-5β-trans-17 (20)-pregnen-21-oate. This material was acetylated with 25 ml. of acetic anhydride and 50 ml. of pyridine during a period of 18 hours at room temperature. The crude acetate of methyl 3α-hydroxy-11-keto-16α-methyl-5β-trans-17(20)-pregnen-21-oate was recrystallized from Skellysolve B hexanes and acetone to give 13.36 g. melting at 197–200° C. Further recrystallization from methanol gave pure methyl 3α-hydroxy-11-keto-16α-methyl-5β- trans-17(20)-pregnen-21-oate 3-acetate of melting point 201–205° C.

*Analysis.*—Calcd. for $C_{25}H_{36}O_5$: C, 72.08; H, 8.71. Found: C, 71.55; H, 8.75.

The other eluate from the chromatogram consisted of 8.75 g. of methyl 3α-hydroxy-11-keto-16α-methyl-5β-cis- 17(20)-pregnen-21-oate which after recrystallization from acetone: Skellysolve B hexanes had a melting point of 158–160° C.

*Analysis.*—Calcd. for $C_{23}H_{34}O_4$: C, 73.76; H, 9.15. Found: C, 72.95; H, 9.52.

8 g. of this material was acetylated in 50 ml. of pyridine and 25 ml. of acetic anhydride. This material was isolated with methylene chloride to give a non-crystalline methyl 3α - hydroxy - 11 - keto - 16α - methyl - 5β- cis-17(20)-pregnen-21-oate 3-acetate which was used in Example 9B.

B. *Methyl 3α - acetoxy - 11 - keto - 16α - hydroxy - 16β- methyl-5β-trans-17(20)-pregnen-21-oate and a ₋cis isomer thereof*

A mixture of 8.7 g. of 3α-acetoxy-11-keto-16α-methyl- 5β-cis-17(20)-pregnen-21-oate, 1.2 ml. of acetic acid and 18 g. of selenium dioxide in 150 ml. of t-butyl alcohol was heated in a nitrogen atmosphere at reflux temperature for a period of 72 hours. The mixture was thereupon cooled and the insoluble material was removed by filtration through Celite diatomaceous earth. The insoluble material was washed with ethyl acetate and the washings and filtrate combined, evaporated to dryness to give a residue which was redissolved in ethyl acetate. The resulting solution was washed successively with sodium bicarbonate solution, ice cold ammonium sulfide solution, ice cold dilute ammonia solution, ice cold dilute hydrochloric acid solution, aqueous sodium bicarbonate, water and was finally dried over anhydrous sodium sulfate. The thus-obtained solution was evaporated in vacuo to give an oil which was redissolved in methylene chloride and chromatographed over 800 g. of Florisil magnesium silicate. The column was eluted with a gradient solution consisting of Skellysolve B hexanes 60% and 40% acetone and pure Skellysolve B hexanes. The following fractions were obtained in order of increasing polarity:

(1) 447 mg. of the trans isomer of the starting material.

(2) 0.881 g. which comprises methyl 3-acetoxy-11- keto - 16α - hydroxy - 16β - methyl - 5β - trans - 17(20)- pregnen-21-oate which material was triturated with ether, crystallized from acetone: Skellysolve B and twice more recrystallized from acetone: Skellysolve B hexanes to give pure methyl 3α-acetoxy-11-keto-16α-hydroxy-16β- methyl-5β-trans-17(20)-pregnen-21-oate of melting point 195–198° C. and the following analysis:

*Analysis.*—Calcd. for $C_{26}H_{36}O_6$: C, 69.42; H, 8.39. Found: C, 68.83; H, 8.50.

(3) 1.002 g. which was a cis isomer with the hydroxyl group and methyl group in unknown steric configuration on the 16-carbon atom. This compound had a melting point of 194–196° C. after several crystallizations from Skellysolve B hexanes and acetone.

*Analysis.*—Calcd. for $C_{25}H_{36}O_6$: C, 69.42; H, 8.39. Found: C, 68.75; H, 8.60.

(4) In addition 3.93 g. of a material melting at 180– 185° C. after several crystallizations from methanol was obtained.

This material seemed to have a 16-methoxy rather than 16-hydroxyl group.

C. *3α,16α - dihydroxy - 11 - keto - 16β - methyl - 5β- trans-17(20)-pregnen-21-oic acid*

In the manner given in Example 1B, methyl 3α-acetoxy - 16α - hydroxy - 11 - keto - 16β - methyl - 5β- trans-17(20)-pregnen-21-oate was hydrolyzed with potassium hydroxide in methanol to give 3α,16α-dihydroxy- 11 - keto - 16β - methyl - 5β - trans - 17(20) - pregnen- 21-oic acid.

D. *3α,16α - dihydroxy - 11 - keto - 16β - methyl - 5β, 17(20)-pregnen-21-oic acid γ-lactone*

In the manner given in Example 1C, 3α,16α-dihydroxy- 11 - keto - 16β - methyl - 5β - trans - 17(20) - pregnen- 21-oic acid was treated with p-ethylbenzenesulfonyl bromide to give 3α,16α-dihydroxy-11-keto-16β-methyl-5β, 17(20)-pregnen-21-oic acid γ-lactone.

EXAMPLE 10.—3β,16β - DIHYDROXY - 11 - KETO- 16α - METHYL - 5α,17(20) - PREGNEN - 21 - OIC ACID γ-LACTONE

A. *Methyl 3β - acetoxy - 11,16 - diketo - 5α - trans- 17(20)-pregnen-21-oate*

A chromium trioxide-pyridine complex solution was produced by dissolving 1 g. of chromium trioxide in 20 ml. of pyridine. One gram of methyl 3-acetoxy-11- keto - 16β - hydroxy - 5α - trans - 17(20) - pregnen - 21- oate was oxidized with 15 ml. of this chromium trioxide- pyridine complex at room temperature. After 18 hours the reaction mixture was poured into water and extracted twice with toluene. The toluene extracts were evaporated in vacuo to give a residue which was twice recrystallized from methanol to yield methyl 3β-acetoxy-11,16- diketo - 5α - trans - 17(20) - pregnen - 21 - oate.

B. *Methyl 3β,16β-dihydroxy-11-keto-16α-methyl-5α-trans-17(20)-pregnen-21-oate 3-acetate*

To a solution of 1 g. of methyl 3β-acetoxy-11,16-diketo-5α-trans-17(20)-pregnen-21-oate in 50 ml. of tetrahydrofuran is added with stirring in a nitrogen atmosphere 1 molecular equivalent of methyl lithium in ether (prepared as described by H. Gilman et al., J. Am. Chem. Soc., 55, 1252, 1933). The mixture was stirred for one hour at room temperature and was then heated under reflux for three hours. After cooling in an ice bath, water was carefully added. The organic layer was separated, washed further with water, dried over anhydrous sodium sulfate, and the solvent was then removed in vacuo to give a residue. This residue was dissolved in methylene chloride and chromatographed over 300 g. of silica gel using increasing percentages of acetone in Skellysolve B hexanes. The fractions which contained methyl 3β-acetoxy - 16β - hydroxy - 11 - keto - 16α - methyl - 5α-trans-17(20)-pregnen-21-oate were combined and evaporated and used in the crude form for Step C.

C. *3β,16β-dihydroxy-11-keto-16α-methyl-5α-trans-17(20)-pregnen-21-oic acid*

In the manner given in Example 1B, methyl 3β-acetoxy - 16β - hydroxy - 11 - keto - 16α - methyl - 5α-trans-17(20)-pregnen-21-oate was hydrolyzed in methanol with potassium hydroxide to give 3β,16β-dihydroxy-11 - keto - 16α - methyl - 5α - trans - 17(20) - pregnen-21-oic acid.

D. *3β,16β-dihydroxy-11-keto-16α-methyl-5α,17(20)-pregnen-21-oic acid γ-lactone*

In the manner given in Example 1C, 3β,16β-dihydroxy-11 - keto - 16α - methyl - 5α - trans - 17(20) - pregnen-21-oic acid was treated with toluenesulfonyl chloride to give 3β,16β - dihydroxy - 11 - keto - 16α - methyl - 5α,17(20)-pregnen-21-oic acid γ-lactone.

In the same manner given in the preceding examples, other γ-lactones of 16-hydroxy-trans-17(20)-pregnen-21-oic acids can be obtained by reacting the corresponding 16-hydroxy-trans-17(20)-pregnen-21-oic acids with an organic sulfonyl chloride or respectively a hydrocarbon carboxylic acid anhydride as defined earlier. Other representative γ-lactones of this type obtained by the above process include:

3,11-diketo-16α-hydroxy-5α,17(20)-pregnen-21-oic γ-lactone 3-cyclic ethylene acetal;
3,11-diketo-16β-hydroxy-5α,17(20)-pregnen-21-oic acid γ-lactone 3-cyclic 1,3-propylene acetal;
3,11-diketo-16β-hydroxy-5,17(20)-pregnadien-21-oic acid γ-lactone 3-cyclic ethylene acetal;
3,11-diketo-16β-hydroxy-5,17(20)-pregnadien-21-oic acid γ-lactone 3-cyclic 1,2-octylene acetal;
3-keto,16β-hydroxy-4,17(20)-pregnadien-21-oic acid γ-lactone;
3-keto-16β-hydroxy-1,4,17(20)-pregnatrien-21-oic acid γ-lactone;
3-keto-11α-acetoxy-16β-hydroxy-1,4,17(20)-pregnatrien-21-oic acid γ-lactone;
3-keto-11α-lauryloxy-16β-hydroxy-1,4,17(20)-pregnatrien-21-oic acid γ-lactone;
3-keto-11β-trimethylacetoxy-16β-hydroxy-1,4,17(20)-pregnatrien-21-oic acid γ-lactone;
3-keto-5α,16β-dihydroxy-6β-chloro-5α,17(20)-pregnen-21-oic acid γ-lactone 3 cyclic ethylene acetal;
3-keto-5α,16β-dihydroxy-6β-fluoro-16α-methyl-5α,17(20)-pregnen-21-oic acid γ-lactone 3-cyclic ethylene acetal;
3α-propionoxy-16α-hydroxy-16β-methyl-5α,17(20)-pregnen-21-oic acid γ-lactone;
3β,11α-dihexanoyl-16α-hydroxy-5β,17(20)-pregnen-21-oic acid γ-lactone;
3β,11α-diphenylacetoxy-16β-hydroxy-5,17(20)-pregnadien-21-oic acid γ-lactone;
3,11-diketo,16β-hydroxy,1,4,6,17(20)-pregnatetraen-21-oic acid γ-lactone;
and the like The starting materials, trans-17(20)-pregnen-21-oic acids containing a 16-hydroxy group, are produced from the corresponding esters by hydrolysis as shown in Examples 1 and 2. The esters of the 16-hydroxy-trans-17(20)-pregnen-21-oic acid are produced from 17(20)-pregnen-21-oic acid esters either by methods of fermentation, for example, with *Streptomyces roseochromogenous* or treating such cis or trans compounds with selenium dioxide. When selenium dioxide is used from a cis-17(20)-pregnen-21-oic acid ester, a 16α-hydroxy-cis-17(20)-pregnen-21-oic acid ester and a 16β-hydroxy-trans-17(20)-pregnen-21-oic acid ester are obtained, which can be easily separated. From a trans starting material with selenium dioxide the corresponding 16α-hydroxy-trans-17(20)-pregnen-21-oic acid ester is obtained which if desired can be converted to the 16β-hydroxy-trans-17(20)-pregnen-21-oic acid ester by oxidation of the 16-hydroxyl group to a 16-keto group and subsequent reduction with, for example, lithium aluminum hydride or sodium borohydride.

EXAMPLE 11.—3β,16α-DIHYDROXY-11-KETO-5α,17(20)-PREGNEN - 21 - OIC ACID γ - LACTONE 3-PHOSPHATE

A. *Methyl 3β-acetoxy-11-keto-5α-trans-17(20)-pregnen-21-oate*

A solution was prepared containing 100 g. of methyl 3β-hydroxy-11-keto-5α-cis-17(20) - pregnen - 21 - oate in 1750 ml. of methanol and 250 ml. of methanolic 25% potassium hydroxide solution. The reaction mixture was heated to reflux for 2 hours in a nitrogen atmosphere. At the end of this period the methanol was removed in vacuo and the residue taken up in methylene chloride. The organic solution was washed with water until neutral and the aqueous layer was back-extracted with methylene chloride. The methylene chloride solution washes were combined, dried over anhydrous sodium sulfate, and the solvent (methylene chloride) was removed to give a crude product. The crude product was dissolved in 250 ml. of methylene chloride, then chromatographed over 1500 g. of anhydrous magnesium silicate, using Skellysolve B hexanes and acetone, the latter up to 30% as diluent. The main crystalline fractions were combined and recrystallized from acetone-Skellysolve B hexanes to give methyl 3β-hydroxy-11-keto-5α-trans-17(20) - pregnen-21-oate.

The thus-obtained material was acetylated in a mixture of 500 ml. of acetic anhydride and 1000 ml. of pyridine at room temperature (22–25° C.) during a period of 18 hours. The reaction mixture was thereupon poured into 2 l. of ice water and extracted with three 1-liter portions of chloroform. The chloroform extracts were combined, dried over anhydrous sodium sulfate, evaporated, and the material recrystallized from acetone to give methyl 3β-acetoxy-11-keto-5α-trans-17(20)-pregnen-21-oate.

B. *Methyl 3β-acetoxy-11-keto-16α-hydroxy-5α-trans-17(20)-pregnen-21-oate*

A reaction mixture was prepared containing 25 g. of methyl 3β-hydroxy-11-keto-5α-trans-17(20) - pregnen-21-oate 3-acetate in 1750 ml. of t-butyl alcohol, 2.5 ml. of acetic acid and 25 g. of selenium dioxide. This reaction mixture was heated to reflux for a period of 18 hours under nitrogen. After cooling, the mixture was filtered through diatomaceous earth and magnesium silicate. The filter cake was washed with ethyl acetate and the filtrate and washings were combined. The filtrate was thereupon evaporated to dryness and the residue was taken up in ethyl acetate which was washed successively with sodium bicarbonate solution, freshly prepared ice cold ammonium sulfide solution, aqueous dilute ammonia, aqueous dilute hydrochloric acid, aqueous sodium bicarbonate solution, and water. The remaining organic layer was dried over sodium sulfate and evaporated to dryness in vacuo. The crude material was dissolved in methylene chloride and chromatographed over 1500 g. of Florisil anhydrous magnesium silicate using gradient elution with Skellysolve B hexanes and increasing percentages of acetone. The main crystalline fraction which was identified by infrared spectroscopy was methyl 3β-acetoxy-11-keto-16α-hydroxy-5α-trans-17(20)-pregnen-21-oate.

C. *3β,16α-dihydroxy-11-keto-5α-trans-17(20)-pregnen-21-oic acid 16-tetrahydropyranyl ether*

A solution of 2 g. of methyl 3β-acetoxy-11-keto-16α-hydroxy-5α-trans-17(20)-pregnen-21-oate in 10 ml. of benzene was admixed with 5 ml. of dihydropyran in 50 ml. of p-toluene-sulfonic acid. The mixture was stirred at room temperature for a period of 4 hours. The benzene solution was then washed with sodium bicarbonate solution, water and then dried over anhydrous sodium sulfate. After evaporation of the reaction mixture an oil was obtained which was heated in 30 ml. of dioxane with 3 g. of potassium hydroxide in 30 ml. of water. After cooling, more water was added and the mixture was thereupon extracted with 3 portions of 50 ml. methylene chloride. The methylene chloride extracts were discarded and the remaining aqueous layer was cooled to 0° by adding ice in excess and was then carefully acidified with hydrochloric acid. The ice-cold acidified reaction mixture was thereupon rapidly extracted with methylene chloride, the methylene chloride extracts were combined, washed with water, dried over anhydrous sodium sulfate, filtered and evaporated in vacuo to give 3β,16α-dihydroxy-11-keto-5α-trans-17(20)-pregnen-21-oic acid 16-tetrahydropyranyl ether.

D. *3β,16α-dihydroxy-11-keto-5α,17(20)-pregnen-21-oic acid γ-lactone 3-phosphate*

A mixture of 2 g. of 3β,16α-dihydroxy-11-keto-5α-trans - 17(20) - pregnen - 21 - oic acid 16 - tetrahydropyranyl ether, 50 ml. of 2-cyanoethyl phosphate reagent and 100 ml. of dry pyridine was evaporated to dryness under reduced pressure. The resulting residue was dissolved in pyridine and the solution again evaporated to dryness under reduced pressure. This procedure was repeated twice and the resulting final residue was dissolved in dry pyridine (140 ml.) and thereto was added 24 g. of N,N'-dicyclohexylcarbodiimide. The thus-obtained solution was allowed to stand for 18 hours at room temperature whereupon 12 ml. of water was added and the reaction mixture was allowed to stand for 45 minutes at room temperature. The mixture was then filtered and the filtrate twice extracted with petroleum ether. The petroleum ether extracts were discarded and the aqueous layer evaporated to dryness in vacuo to give a residue. This residue was dissolved in 0.4 N lithium hydroxide (480 ml.) and the thus-obtained solution boiled for a period of 1 hour. The cooled mixture was filtered and the filtrate extracted with two 100-ml. portions of diethyl ether. The ether layer was discarded and the aqueous layer was passed over a volume of 200 ml. of an acid exchange resin (IRC–50) and the column was then washed with 400 ml. of water. The filtrate and washings were partially evaporated in vacuo and thereupon the product obtained by freeze drying was a gummy residue. This residue was dissolved in a mixture of 75 ml. of water and 75 ml. of dioxane and the solution was acidified with 20% aqueous sulfuric acid. This solution was allowed to stand at room temperature for 18 hours. Thereafter the pH of the residual solution was adjusted to pH 7.5 with saturated barium hydroxide solution and the resulting barium sulfate was removed by filtration. The thus-obtained filtrate was freeze-dried, yielding 3β,16α-dihydroxy-11-keto-5α-trans-17(20)-pregnen-21-oic acid 3 phosphate as the barium salt.

The free 3-phosphate was obtained by passing an aqueous solution of 3β,16α - dihydroxy - 11-keto-5α-trans-17(20)-pregnen-21-oic acid 3-phosphate barium salt over the exchange resin IRC–50 (H-cycle) and freeze drying the aqueous eluates after adjusting the pH to 7.5.

Two grams of 3β,16α - dihydroxy - 11-keto-5α-trans-17(20)-pregnen-21-oic acid 3-phosphate was dissolved in 50 ml. of pyridine and the solution was cooled to 0° in an ice-salt bath. To this solution was added 1.1 g. of p-toluenesulfonyl chloride over a period of 20 minutes. After stirring the reaction mixture for 1 hour at 0° the mixture was allowed to stand for a period of 18 hours at a temperature of 0–5° C. Thereto was then added 20 ml. of water and the resulting mixture was again stirred for 45 minutes at room temperature and filtered. The filtrate was extracted twice with ether. The ether extracts were discarded and the aqueous remaining solution was freeze-dried to give crude 3β,16α-dihydroxy-11-keto-5α,17(20)-pregnen-21-oic acid γ-lactone 3-phosphate.

Pure material was obtained by dissolving crude 3β,16α-dihydroxy-11-keto-5α,17(20)-pregnen-21-oic acid γ-lactone 3-phosphate in 50 ml. of water, filtering the thus-obtained solution and applying the filtrate to 100 ml. of Dowex–1X8 (formate-cycle). The column was then developed with 500 ml. portions of 0.01 N, 0.02 N, 0.04 N and 0.08 N formic acid, collecting 10 ml. portions. The chromatogram fractions containing the desired product as determined by ultraviolet, infrared, or paper chromatography are combined and evaporated to dryness in vacuo. The residue is triturated with water and refrigerated. The crystals are collected by filtration to give 3β,16α-dihydroxy-11-keto-5α,17(20) - pregnen - 21 - oic acid γ-lactone 3-phosphate in a pure quality.

In the same manner given in the above examples, other 3-phosphates can be made by using a starting material having the formula:

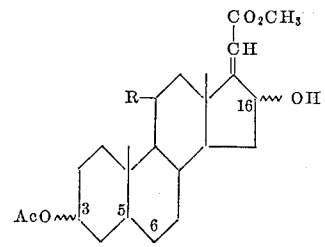

wherein Ac is an acyl radical of a hydrocarbon carboxylic acid containing from 2 to 12 carbon atoms, inclusive; wherein R is selected from the group consisting of

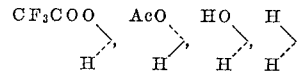

and =O, in which Ac has the same significance as above; and wherein the wavy line at positions 3 and 16 signifies an α or a β connection; and wherein the carbon atoms in positions 5 and 6 are linked by a bond selected from the group consisting of single and double bonds. Representative compounds thus obtained include 3β,16α-dihydroxy-5α,17(20)-pregnen-21-oic acid γ-lactone 3-phosphate, 3α,16α-dihydroxy-5α,17(20)-pregnen-21-oic acid γ-lactone 3-phosphate, 3β,16α-dihydroxy-11α-trifluoroacetate-5α,17(20)-pregnen-21-oic acid γ-lactone 3-phosphate, 3β,16α-dihydroxy-11β-trifluoroacetate-5α,17(20)-pregnen-21-oic acid γ-lactone 3-phosphate, 3β,16α-dihydroxy-11-keto-5,17(20)-pregnadien-21 oic acid γ-lactone 3-phosphate, 3β,16β-dihydroxy-11-keto-5,17(20)-pregnadien-21-oic acid γ-lactone 3-phosphate, 3α,16β-dihydroxy-11-keto-5,17(20)-pregnadien-21-oic
  acid γ-lactone 3-phosphate,
3β,11β,16α-trihydroxy-5α,17(20)-pregnen-21-oic acid
  γ-lactone 3-phosphate,
and the like.

EXAMPLE 12.—3β,16α-DIHYDROXY-11-KETO-5β,17(20)-PREGNEN-21-OIC ACID γ-LACTONE 3-SULFATE AND SALTS

A solution of 1.0 g. of 3β,16α-dihydroxy-11-keto-5β,17(20)-pregnen-21-oic acid γ-lactone in 20 ml. of dry pyridine was cooled to 0° C. and added to a mixture prepared by the slow addition of 1 ml. of cholosulfonic acid to 5 ml. of dry pyridine at 0° C. The resultant mixture was allowed to warm to 25° C. and stand overnight, and then was evaporated to dryness under a vacuum of 0.3 mm. The residue was partitioned between 50 ml. of 1 M aqueous pyridinium sulfate and 50 ml. of cholorform. The aqueous layer was re-extracted with 50 ml. of chloroform; the combined organic layers were filtered and evaporated. The residue was dissolved in 50 ml. of water, filtered through Celite (diatomaceous earth) and freeze dried to give 0.8 g. of 3β,16α-dihydroxy-11-keto-5β,17(20)-pregnen-21-oic acid γ-lactone 3-sulfate pyridinium salt.

The sodium salt is prepared by dissolving the pyridinium salt in the equivalent amonut of aqueous sodium bicarbonate solution. The solution is filtered through Celite and then freeze dried to give the sodium salt of the 3-sulfate of 3β,16α-dihydroxy-11-keto-5β,17(20)-pregnen-21-oic acid γ-lactone.

Treatment of finely powdered 3β,16α-dihydroxy-11-keto-5β,17(20)-pregnen-21-oic acid γ-lactone 3-sulfate sodium in anhydrous methanol with hydrogen chloride gas, filtration of the reaction mixture and evaporation of the solvent yielded 3β,16α-dihydroxy-11-keto-5β,17(20)-pregnen-21-oic acid γ-lactone 3-sulfate. Alternatively, an aqueous solution of either the pyridinium salt or the sodium salt of the steroid sulfate is passed over the ion exchange resin Dowex 50W, the column washed with water, and the eluted free sulfate isolated after freeze drying.

In the manner given in Example 11, 3β,16β-dihydroxy-11-keto-5α,17(20)-pregnen-21-oic acid γ-lactone (Example 5) can be converted to its 3-sulfate pyridinium salt by reaction of the lactone with chlorosulfonic acid in pyridine and treatment with pyridinium sulfate.

The thus-obtained 3β,16β-dihydroxy-11-keto-5α,17(20)-pregnen-21-oic acid γ-lactone 3-sulfate pyridinium salt can be converted to the sodium salt by treating the pyridinium salt with sodium bicarbonate solution, as shown above. The water-soluble 3β,16β-dihydroxy-11-keto-5α,17(20)-pregnen-21-oic acid γ-lactone 3-sulfate sodium salt has a melting point of 193–195° C.

Treatment of finely powdered 3β,16β-dihydroxy-11-keto-5β,17(20)-pregnen-21-oic acid γ-lactone 3-sulfate sodium in anhydrous methanol with hydrogen chloride gas, filtration of the reaction mixture and evaporation of the solvent yielded 3β,16β-dihydroxy-11-keto-5β,17(20)-pregnen-21-oic acid γ-lactone 3-sulfate. Alternatively, an aqueous solution of either the pyridinium salt or the sodium salt of the steroid sulfate is passed over the ion exchange resin Dowex 50W, the column washed with water, and the eluted free sulfate isolated after freeze drying.

Likewise as in Example 12, other 3-sulfate steroid 16-lactones can be prepared by reacting a selected 3,16-dihydroxy-17(20)-pregnen-21-oic acid γ-lactone with chlorosulfonic acid in pyridine, converting the resulting crude material to the pyridinium salt with pyridinium sulfate; if desired, converting the pyridinium sulfate salt to the sodium sulfate salt and to the free sulfate as disclosed in Example 12. Representative compounds thus obtained include:

3β,16α-dihydroxy-5β,17(20)-pregnen-21-oic acid
  γ-lactone 3-sulfate,
3α,16β-dihydroxy-5β,17(20)-pregnen-21-oic acid
  γ-lactone 3-sulfate,
3β,16α-dihydroxy-5,17(20)-pregnadien-21-oic acid
  γ-lactone 3-sulfate,
3α,16α-dihydroxy-5,17(20)-pregnadien-21-oic acid
  γ-lactone 3-sulfate,
3β,16α-dihydroxy-11-keto-5,17(20)-pregnadien-21-oic
  acid γ-lactone 3-sulfate,
3α,16β-dihydroxy-11-keto-5,17(20)-pregnadien-21-oic
  acid γ-lactone 3-sulfate,
3α,16α-dihydroxy-5α,17(20)-pregnen-21-oic acid
  γ-lactone 3-sulfate,
3β,16β-dihydroxy-5α,17(20)-pregnen-21-oic acid
  γ-lactone 3-sulfate,
3α,11β,16β-trihydroxy-5α,17(20)-pregnen-21-oic acid
  γ-lactone 3-sulfate,
3β,11β,16α-trihydroxy-5α,17(20)-pregnen-21-oic acid
  γ-lactone 3-sulfate,
3α,11β,16α-trihydroxy-5,17(20)-pregnadien-21-oic acid
  γ-lactone 3-sulfate,
3β,11β,16β-trihydroxy-5,17(20)-pregnadien-21-oic acid
  γ-lactone 3-sulfate,
3β,16β-dihydroxy-11α-acetoxy-5,17(20)-pregnadien-21-oic acid γ-lactone 3-sulfate,
3β,16β-dihydroxy-11β-trifluoroacetoxy-5,17(20)-pregnadien-21-oic acid γ-lactone 3-sulfate,
3β,16β-dihydroxy-11α-octyloxy-5,17(20)-pregnadien-21-oic acid γ-lactone 3-sulfate,
3β,16α-dihydroxy-11β-trifluoroacetoxy-5,17(20)-pregnadien-21-oic acid γ-lactone 3-sulfate,
and the like.

I claim:
1. A steroid γ-lactone selected from the formulae consisting of:

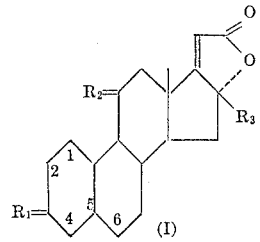

and

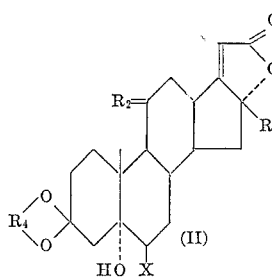

wherein $R_1$ is selected from the group consisting of

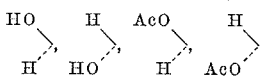

and oxygen, in which Ac is the acyl group of a hydrocarbon carboxylic acid containing from one to twelve carbon atoms, inclusive; wherein $R_2$ is selected from the group consisting of

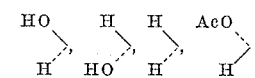

and oxygen in which Ac is defined as hereinabove; wherein $R_3$ is selected from the group consisting of hydrogen and methyl; wherein $R_4$ is an alkylene radical containing not more than eight carbon atoms, inclusive, and the attaching oxygen to carbon bonds are separated by a chain of at least two and not more than three carbon atoms; and wherein X is selected from the group consisting of chlorine, fluorine, and methyl; and wherein, in the compounds of Formula I, when $R_1$ is oxygen, the linkages of the carbon atoms in positions 1,2 and 4,5 are selected from the combinations consisting of one double bond in position 4,5 and a single bond in position 1,2 and double bonds in both positions 1,2 and 4,5 and when $R_1$ has the value of hydroxy-hydrogen or acyloxy-hydroxy, as defined above, the carbon linkages are selected from the combination consisting of single bond linkages only and the combination of single bond linkages and a 5,6-double bond.

2. 3,11 - diketo - 16α-hydroxy-1,4,17(20)-pregnatrien-21-oic acid γ-lactone.

3. 3β,16α - dihydroxy - 11 - keto-5α,17(20)-pregnen-21-oic acid γ-lactone.

4. 3α,16α - dihydroxy - 11 - keto - 16β-methyl-5β,17-(20)-pregnen-21-oic acid γ-lactone.

5. A steroid γ-lactone 3-ester of the formula:

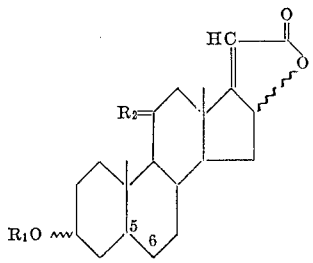

wherein $R_1$ is selected from the group consisting of

and

wherein $R_2$ is selected from the group consisting of

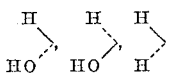

and keto oxygen; and wherein the linkage between carbon atoms 5 and 6 is selected from the group consisting of single and double bonds.

6. 3β,16α - dihydroxy - 11 - keto - 5α,17(20)-pregnen-21-oic acid γ-lactone 3-sulfate.

7. The sodium salt of 3β,16α-dihydroxy-11-keto-5α,17-(20)-pregnen-21-oic acid γ-lactone 3-sulfate.

8. 3β,16α - dihydroxy - 11 - keto-5α,17(20)-pregnen-21-oic acid γ-lactone 3-phosphate.

9. 3,11 - diketo - 5α,16β - dihydroxy-6β-methyl-5α,17-(20)-pregnen-21-oic acid γ-lactone 3-cyclic ethylene acetal.

10. 3,11 - diketo - 5α,16β - dihydroxy-6β-fluoro-5α,17-(20)-pregnen-21-oic acid γ-lactone 3-cyclic ethylene acetal.

11. A process for the production of a 16-hydroxy-17-(20)-pregnen-21-oic acid γ-lactone which comprises treating a 16-hydroxy-trans-17(20)-pregnen-21-oic acid with a reagent selected from the group consisting of organic sulfonyl halide of the formula:

$$ROSO_2X$$

in which R is selected from the group consisting of alkyl, aryl and aralkyl, containing up to and including ten carbon atoms, and in which X is a halogen selected from the group consisting of chlorine and bromine, and acid anhydrides of hydrocarbon carboxylic acids-containing from two to twelve carbon atoms, inclusive, to obtain a 16-hydroxy-17(20)-pregnen-21-oic acid γ-lactone.

12. A process for the production of a 16β-hydroxy-17-(20)-pregnen-21-oic acid γ-lactone which comprises treating at a temperature between minus 50° and plus 75° C. a 16β-hydroxy-trans-17(20)-pregnen-21-oic acid with an organic sulfonyl halide of the formula:

$$ROSO_2Cl$$

wherein R is selected from the group consisting of alkyl, aryl and aralkyl containing from one to ten carbon atoms, inclusive, to obtain the corresponding 16β-hydroxy-17-(20)-pregnen-21-oic acid γ-lactone.

13. The process of claim 12 wherein the 16β-hydroxy-trans-17(20)-pregnen-21-oic acid is 3,11-diketo-16-hydroxy-trans-1,4,17(20)-pregnatrien-21-oic acid.

14. A process for the production of a 16α-hydroxy-17(20)-pregnen-21-oic acid γ-lactone which comprises treating at a temperature between minus 50° and plus 75° C. a 16α-hydroxy-trans-17(20)-pregnen-21-oic acid with an organic sulfonyl halide of the formula:

$$ROSO_2Cl$$

wherein R is selected from the group consisting of alkyl, aryl and aralkyl containing up to and including ten carbon atoms, to obtain the corresponding 16α-hydroxy-17(20)-pregnen-21-oic acid γ-lactone.

15. A process for the production of a 16α-hydroxy-17(20)-pregnen-21-oic acid γ-lactone which comprises treating at a temperature between 50° and 225° C. a 16α-hydroxy-trans-17(20)-pregnen-21-oic acid with an anhydride of a hydrocarbon carboxylic acid containing from two to twelve carbon atoms, inclusive, to obtain the corresponding 16α-hydroxy-17(20)-pregnen-21-oic acid γ-lactone.

16. The process of claim 15 wherein the 16α-hydroxy-trans-17(20)-pregnen-21-oic acid is 3,11-diketo-16α-hydroxy-trans-1,4,17(20)-pregnatrien-21-oic acid and the anhydride is acetic anhydride.

17. A process for the production of a mixture of a 16α-hydroxy-17(20)-pregnen-21-oic acid γ-lactone and 16β-hydroxy-17(20)-pregnen-21-oic acid γ-lactone, which comprises treating a 16β-hydroxy-trans-17(20)-pregnen-21-oic acid with an anhydride of a hydrocarbon carboxylic acid containing from two to twelve carbon atoms, inclusive, at a temperature between 50° and 225° C.

18. A method for the hydrolysis of a 21-alkyl ester of a 16α-hydroxy-trans-17(20)-pregnen-21-oic acid, without concomitant rearrangement which comprises treating the 16α-hydroxy-trans-17(20)-pregnen-21-oic acid with dihydropyran in the presence of an acid catalyst to give the 16-tetrahydropyranyl ether of 21-alkyl 16α-hydroxy-trans-17(20)-pregnen-21-oate, and hydrolyzing this product with an alkali-metal base, followed by treatment with a mineral acid to obtain the corresponding 16α-hydroxy-trans-17(20)-pregnen-21-oic acid.

References Cited by the Examiner
UNITED STATES PATENTS
3,162,631  12/1964  Pike _____ 260—239.57

LEWIS GOTTS, *Primary Examiner.*